US009033784B2

(12) United States Patent
Vancura et al.

(10) Patent No.: US 9,033,784 B2
(45) Date of Patent: May 19, 2015

(54) VIDEO POKER METHOD OF PLAY

(71) Applicant: AGS, LLC, Las Vegas, NV (US)

(72) Inventors: Olaf Vancura, Las Vegas, NV (US); Robert L. Miodunski, Henderson, NV (US)

( * ) Notice: Subject to any disclaimer, the term of this patent is extended or adjusted under 35 U.S.C. 154(b) by 0 days.

(21) Appl. No.: 13/869,157

(22) Filed: Apr. 24, 2013

(65) Prior Publication Data

US 2014/0194175 A1 Jul. 10, 2014

Related U.S. Application Data

(63) Continuation-in-part of application No. 13/159,186, filed on Jun. 13, 2011.

(60) Provisional application No. 61/354,496, filed on Jun. 14, 2010.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ............ *G07F 17/3293* (2013.01); *G07F 17/32* (2013.01)

(58) Field of Classification Search
USPC .......... 273/85, 149, 292, 303; 463/11, 13, 16, 463/20, 25
See application file for complete search history.

(56) References Cited

U.S. PATENT DOCUMENTS

| | | | | |
|---|---|---|---|---|
| 4,743,022 A * | 5/1988 | Wood | ........................... | 463/13 |
| 5,019,973 A | 5/1991 | Wilcox et al. | | |
| 5,437,451 A | 8/1995 | Fulton | | |
| 5,531,448 A | 7/1996 | Moody | | |
| 5,722,661 A | 3/1998 | Skratulia et al. | | |
| 5,732,950 A | 3/1998 | Moody | | |
| 5,816,916 A | 10/1998 | Moody | | |
| 5,823,873 A | 10/1998 | Moody | | |
| 5,868,618 A | 2/1999 | Netley et al. | | |
| 5,897,436 A | 4/1999 | Singer et al. | | |
| 5,947,821 A | 9/1999 | Stone | | |
| 5,976,016 A | 11/1999 | Moody et al. | | |
| 6,007,066 A * | 12/1999 | Moody | ........................ | 273/292 |
| 6,050,568 A | 4/2000 | Hachquet | | |
| 6,065,753 A | 5/2000 | Morosky | | |
| 6,098,985 A | 8/2000 | Moody | | |
| 6,120,378 A | 9/2000 | Moody et al. | | |
| 6,193,606 B1 | 2/2001 | Walker et al. | | |
| 6,248,016 B1 | 6/2001 | Walker et al. | | |
| 6,270,405 B1 | 8/2001 | Ferguson | | |
| 6,371,484 B1 | 4/2002 | Yuan | | |
| 6,416,407 B1 | 7/2002 | Carrico et al. | | |
| 6,419,578 B1 | 7/2002 | Moody et al. | | |
| 6,471,587 B1 | 10/2002 | Wood et al. | | |

(Continued)

*Primary Examiner* — Adetokunbo O Torimiro
(74) *Attorney, Agent, or Firm* — Weide & Miller, Ltd.

(57) ABSTRACT

In accordance with a poker game, a player is dealt a first set of cards, such as 5 cards. The player elects which cards to hold and which cards to discard, if any. Upon discarding any cards, a player is dealt a second set of cards, preferably in the same number as the first set of cards. Subsets of the second set of replacement cards are combined with the cards held from the first set of cards to form final hands of cards. Each final hand is evaluated to determine if it is a winning or losing hand, such as against a standard poker paytable. Awards may be varied depending upon the size of the player's wager and/or the number of cards the player holds/discards from the first set.

22 Claims, 3 Drawing Sheets

(56) References Cited

U.S. PATENT DOCUMENTS

| | | | |
|---|---|---|---|
| 6,474,645 | B2 | 11/2002 | Tarantino |
| 6,481,717 | B1 | 11/2002 | Richardelle |
| 6,569,013 | B1 | 5/2003 | Taylor |
| 6,575,467 | B1 | 6/2003 | Kal |
| 6,585,588 | B2 | 7/2003 | Hart |
| 6,612,927 | B1 | 9/2003 | Slomiany et al. |
| 6,638,163 | B2 | 10/2003 | Moody |
| 6,672,959 | B2 | 1/2004 | Moody et al. |
| 6,729,621 | B2 | 5/2004 | Moody |
| 6,729,961 | B1 | 5/2004 | Millerschone |
| 6,802,773 | B2 | 10/2004 | Moody |
| 6,802,774 | B1 | 10/2004 | Carlson et al. |
| 6,913,531 | B1 | 7/2005 | Yoseloff |
| 7,201,654 | B1 | 4/2007 | Jarvis et al. |
| 7,749,059 | B2 | 7/2010 | Tarantino |
| 2002/0008356 | A1 * | 1/2002 | De Keller .................... 273/292 |
| 2002/0198040 | A1 | 12/2002 | Moody |
| 2003/0032469 | A1 | 2/2003 | Moody et al. |
| 2003/0038425 | A1 | 2/2003 | Tarantino |
| 2003/0100357 | A1 | 5/2003 | Walker et al. |
| 2003/0107176 | A1 | 6/2003 | Goldman et al. |
| 2003/0122305 | A1 | 7/2003 | Malcolm |
| 2003/0130023 | A1 | 7/2003 | Angel |
| 2003/0207707 | A1 | 11/2003 | Slomiany et al. |
| 2004/0212147 | A1 | 10/2004 | Ward et al. |
| 2005/0037839 | A1 | 2/2005 | Yoseloff |
| 2005/0059462 | A1 | 3/2005 | Gerrard |
| 2006/0125181 | A1 * | 6/2006 | Malone et al. ................ 273/292 |
| 2006/0258433 | A1 | 11/2006 | Finocchio et al. |

* cited by examiner

VIDEO POKER METHOD OF PLAY

RELATED APPLICATION DATA

This application is a continuation-in-part of U.S. application Ser. No. 13/159,186 filed Jun. 13, 2011, which claims priority to U.S. Provisional Application Ser. No. 61/354,496, filed Jun. 14, 2010.

FIELD OF THE INVENTION

The present invention relates in general to a gaming device, and more particularly to a device and method of play for video poker.

BACKGROUND OF THE INVENTION

Video poker players are continually attracted to new and different ways to play. As such, manufacturers strive to create new variations that are exciting.

The method of play in U.S. Pat. No. 6,007,066, known commercially as Triple Play, Five Play, etc. has proven popular with the gaming public. In the '066 patent, the player wagers on multiple hands, say 3 hands, and is first dealt 5 cards in a conventional manner. The player decides which cards to hold and/or discard. Held cards are duplicated into each of the 3 hands, and replacement cards are then dealt into each hand. The hands are compared to a paytable for resolution. Variations on the '066 patent include the purchase of possible random multipliers via additional wagering (e.g., Super Times Pay, Good Times Pay), and the purchase of multipliers obtained with a winning hand and applicable to subsequent hands (Ultimate X Poker).

A continuing need exists to enhance the player's gaming experience. As players tire and desire new games, a continuing need exists to create exciting new video poker variations. In particular, a need exists to create video poker games in which the player may wager on multiple outcomes simultaneously, with the possibility of bonus multipliers as a result of game play, and with little to no difference in speed of play or player strategy.

SUMMARY OF THE INVENTION

The present invention relates to poker games, and in particular presents a poker game in which the player may wager on multiple outcomes simultaneously, with no difference in speed of play or player strategy. In a preferred embodiment, the game is presented as a video poker game at a gaming machine.

In a preferred embodiment, a game of video poker utilizes a traditional paytable. The game is preferably presented as a wagering game in which the player must place a wager to play the game. In one embodiment, the player preferably places wagers in increment of 10 credits or units at the beginning of the game.

The player is then dealt a first set of cards, such as a set of 5 cards in a conventional manner. The player decides which cards to hold and/or discard from the first set. A second set of cards are then dealt or displayed to the player, the second set preferably having the same number of cards as the first set, such as five cards. The cards of the second set are used as replacement cards to those discarded by the player from the first set. Subsets of the set of replacement cards, in conjunction with the originally held cards, are used to form multiple final poker hands. Each final poker hand is evaluated to determine if it is a winning or losing combination or hand, such as by comparison to the paytable, and any winnings are awarded.

In one embodiment, a multiplier may be applied to the base paytable depending upon the number of cards which the player discards from the original set (and thus the number of cards which are required from the second set to form, in combination with the cards held from the first set, winning final hands).

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises methods of presenting and playing games and gaming machines configured to present games. In one embodiment, the games comprise poker-type card games. Preferably, the games are presented and played as wagering games.

Figure 1:
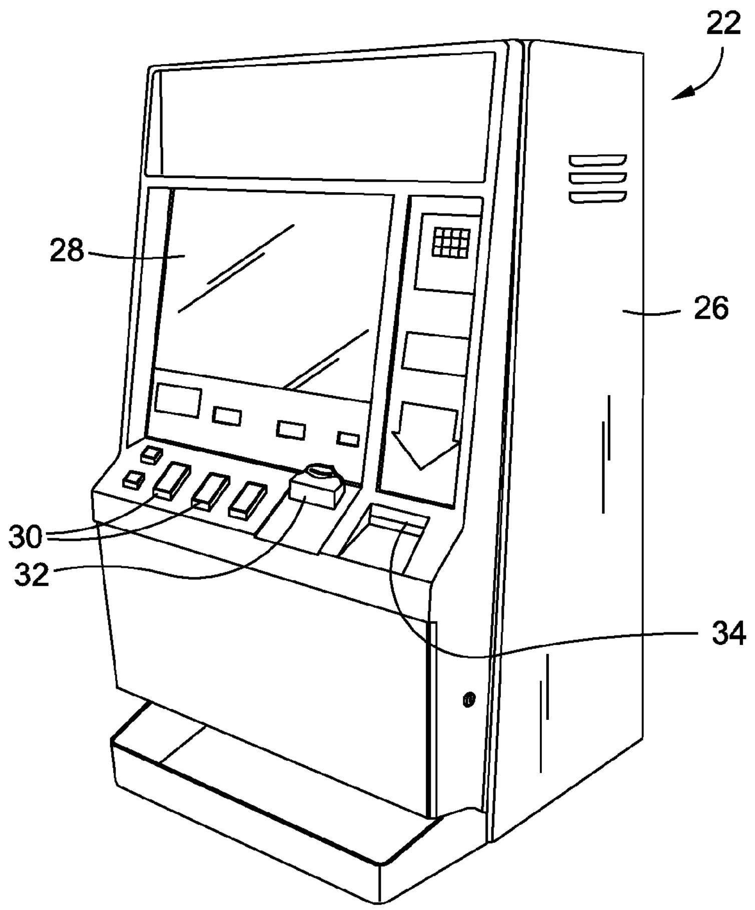
FIG. 1 illustrates a gaming machine at which games of the invention may be presented and played.

While it is possible to present and play the games herein using physical playing cards, the games are preferably presented via or with the aid of a gaming machine. One configuration of a gaming machine is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type or other configuration as is well known to those of skill in the art).

The gaming machine 22 preferably includes at least one display device 28 configured to display game information. The display device 28 may be a mechanical, electro-mechanical or electronic display, such as one or more rotating reels, a video display or the like. When the display device 28 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events.

As described in more detail below, the gaming machine 22 is preferably configured to present one or more games upon a player making a monetary payment or wager. In this regard, as described in more detail below, the gaming machine 22 includes means for accepting monetary value.

In one embodiment, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game (such as spin slot reels or display cards in a video poker game), to indicate cards to be held or discarded in a game of video draw poker, to "cash out" of the gaming machine, or to provide various other inputs.

In one preferred embodiment, the gaming machine 22 includes at least one microprocessor or controller for controlling the gaming machine, including receiving player input and sending output signals for controlling the various components of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information representing images of displayed cards, as disclosed below), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. This software may be configured to implement the game described below, such as in the form of one or more steps. The memory may also store other information, such as pay table information, card images or the like. The gaming machine 22 may also include one or more random number generators for generating random numbers, such as for use in selecting, cards or the like for presenting the game in a random fashion.

The gaming machine 22 may be configured to generate and present games in a standalone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine). In one embodiment, the gaming machines 22 may be game kiosks or interfaces.

As indicated, the gaming machine 22 is configured to present one or more wagering game. Thus, the gaming machines 22 is preferably configured to accept value, such as coins, paper currency or other elements or devices representing value such as monetary funds. For example, as illustrated in FIG. 1, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22, such as by dispensing coins to a coin tray. In another embodiment, funds may be issued by dispensing paper currency. In yet another embodiment, a player may be issued a media, such as a printed ticket, which ticket represents the value which was paid or cashed out of the machine.

It will be appreciated that the gaming machine illustrated in FIG. 1 is only exemplary of one embodiment of a gaming machine. For example, it is possible to for the gaming machine to have various other configurations, including different shapes and styles and having different components than as just described. For example, while the gaming machine or device may be standalone, it may be server-based, server-assisted, linked to other gaming devices, connected to a server, progressive controller (wide-area or local-area), or be handheld and/or wireless. In particular in the case of online wagering, the gaming device may be a computer, mobile phone, or microprocessor-driven device which is programmed to accept wagers, e.g. via downloadable software.

The gaming machine or device 22 may include other features. For example, the gaming machine 22 may include other displays, light, speakers for generating sounds.

In one preferred embodiment, the general electronic configuration of the gaming device is that of a processor/controller, memory device for storing program code or other data, main display device, optional secondary display device, sound card, speakers and one or more input devices. The processor is preferably a microprocessor or a microcontroller capable of displaying images, symbols and other indicia such as the faces and backs of cards. The memory device can include random access memory (RAM) for saving or accessing game data generated or used during a game. The memory device can also include read only memory (ROM) for storing program code which controls the gaming device so that a particular game is loaded and plays in accordance with appropriate game rules and paytables. Although the processor and memory device preferably reside on each gaming device, it is also possible to provide at least some of their functionality at a central location such as a network server for communication to a playing station such as over a local area network (LAN), wide area network (WAN), Internet connection or other wireless link. With regard to generating random events (e.g., the dealing of cards), it is possible for this to occur locally (e.g., at or within the gaming device) or non-locally (e.g., centrally at a server accessed by wire or wirelessly), or a combination thereof.

Preferably, the gaming machine or device 22 displays indicia of playing cards in video or electronic graphical form. To operate the gaming machine 22 the player is preferably required to insert money (or a ticket, or otherwise provide value). The player may then initiate game play by an input, such as by pressing a Bet Max button, or a Bet One button and then a Deal button. The wagering game described herein then begins.

The player preferably uses the input devices such as Bet One, Bet Max, Deal/Draw and Hold/Cancel buttons to input signals to the gaming device. Alternatively or in addition to input buttons, a touch screen may be utilized. In the case of online gaming, a keyboard or mouse may also provide input. In the case of mobile phone gaming, a keyboard or telephone keys may be utilized to provide input.

Figure 2:
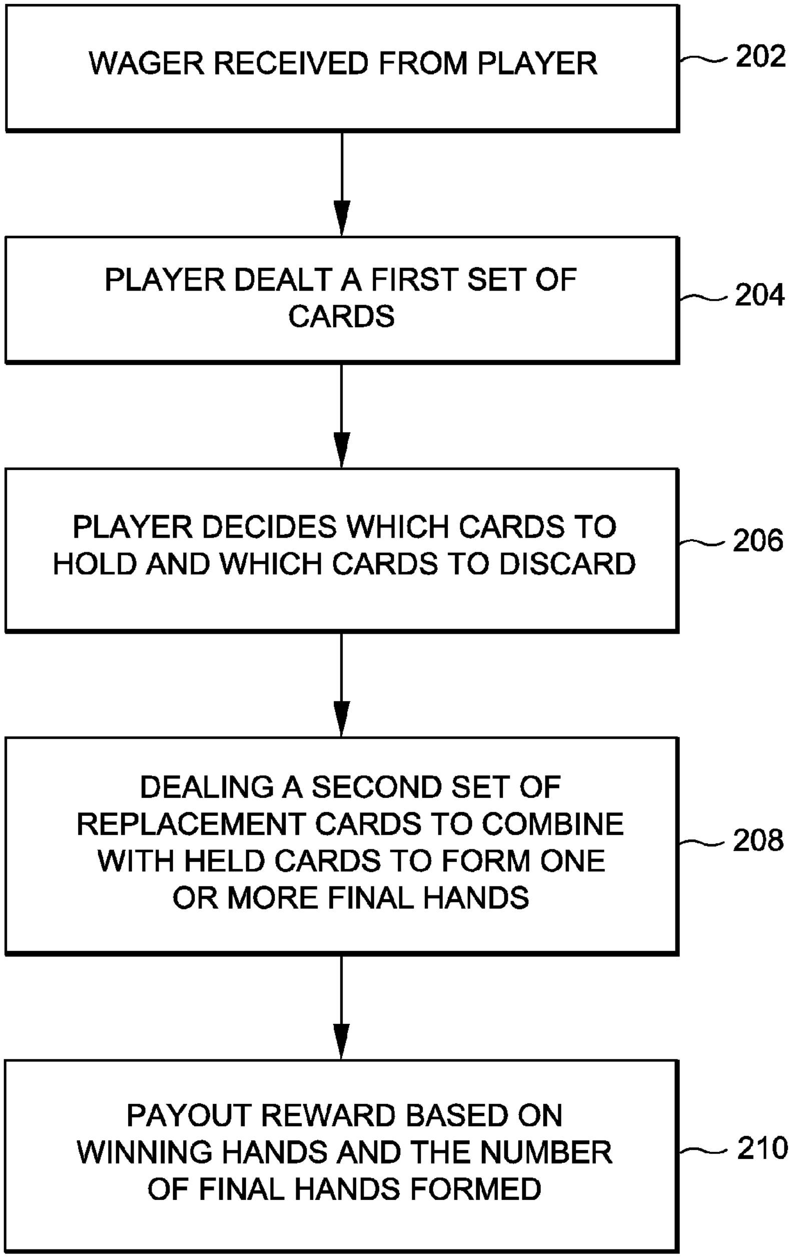
FIG. 2 is a flowchart illustrating one example method according to an exemplary embodiment of the invention.

One embodiment of a method of playing and presenting a game will now be described with reference to FIGS. 2 and 3. In one embodiment, the game is a poker-type game in which a player attempts to achieve a combination of cards which comprises a winning combination of cards. The player may be awarded winnings for one or more winning combinations of cards.

By way of example, the game may be played using a "Jacks or better" base paytable which offers awards for various combinations or "hands" of five cards, such as the following (a typical paytable for the traditional Jacks or better video poker for a wager of 1 credit):

TABLE 1

| | |
|---|---|
| Royal Flush | 250 |
| Straight Flush | 50 |
| 4 of a Kind | 25 |
| Full House | 8 |
| Flush | 5 |
| Straight | 4 |
| 3 of a Kind | 3 |
| 2 Pair | 2 |
| Pair of Jacks or better | 1 |

In one method of play, as indicated above, a player is required to place a wager as indicated in step 202. As one example, the player may place a wager of 10 credits or units. The player is then dealt a first set of five cards 310 as indicated in step 204. This may comprise the gaming machine randomly selecting cards from a deck or set of cards. As one example, as shown in FIG. 3, the five cards 310 might comprise the following: J♠, J♣, 10♥, 7♦, 9♦.

The player decides which cards to hold and which cards to discard from the first set 310, as in accordance with step 206. By way of example, the player may elect to hold the pair of Jacks 312. Thus, the player is discarding 3 cards and will need to draw 3 replacement cards to make a traditional five card hand.

At this point, according to the game play of the present invention, a second set of 5 replacement cards 320 is displayed. Each subset of 3 (of the 5) replacement cards, in turn, is then combined with the held cards to form a final hand which is then evaluated to determine the wagering outcome as indicated in step 208. In a preferred embodiment, all possible permutations of combinations of the replacement cards are utilized in combination with the held cards in order to form final hands 330, as shown in FIG. 3. As detailed below, this results in the creation of multiple final hands (unless the player either holds all cards from the first set, in which case there is a single final hand comprising the initial set of cards, or the player discards all cards from the first set, in which case there is a single final hand comprising the second set of replacement cards), where the number of final hands depends on the number of cards that the player discards from the first set, and thus the number of cards which are used, in combination, from the second set as replacements.

Figure 3:
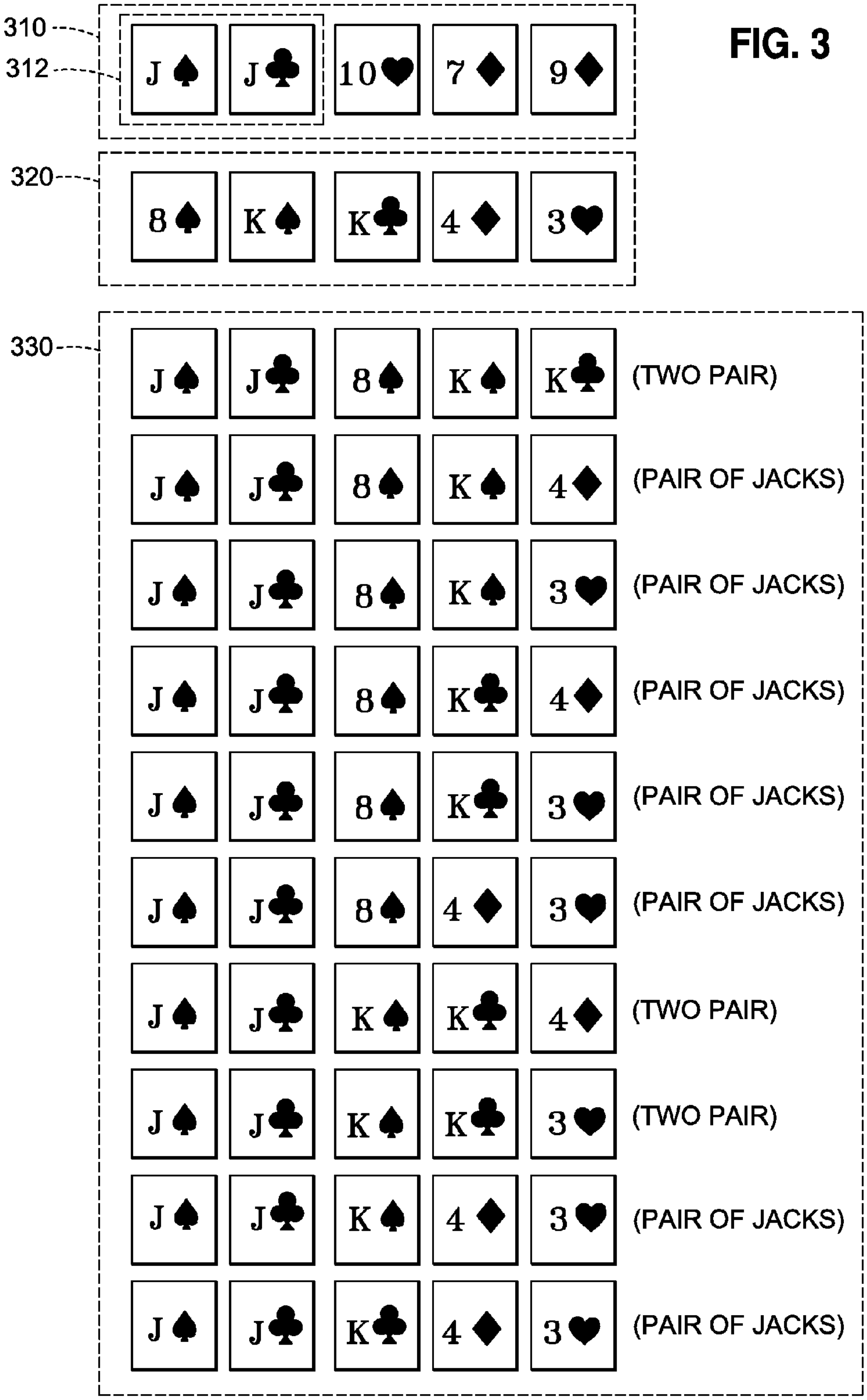
FIG. 3 illustrates an example of an initial set of cards, a replacement set of cards, and a plurality of final hands according to an exemplary embodiment of the invention.

By way of example, consider the following set of 5 replacement cards 320, as shown in FIG. 3: 8♠, K♠, K♣, 4♦, 3♥. The player (who wagered 10 units and, on the original deal, held the 2 Jacks) would thus form the following 10 hands 330 which are compared to the paytable:

J♠, J♣, 8♠, K♠, K♣ (Two Pair)
J♠, J♣, 8♠, K♠, 4♦ (Pair of Jacks)
J♠, J♣, 8♠, K♠, 3♥ (Pair of Jacks)
J♠, J♣, 8♠, K♣, 4♦ (Pair of Jacks)
J♠, J♣, 8♠, K♣, 3♥ (Pair of Jacks)
J♠, J♣, 8♠, 4♦, 3♥ (Pair of Jacks)
J♠, J♣, K♠, K♣, 4♦ (Two Pair)
J♠, J♣, K♠, K♣, 3♥ (Two Pair)
J♠, J♣, K♠, 4♦, 3♥ (Pair of Jacks)
J♠, J♣, K♣, 4♦, 3♥ (Pair of Jacks)

As indicated in step 210, based upon the above-referenced paytable, the player's total return for the 10 final hands is thus 13 units, for a net gain of 3 units. As can be appreciated, although the player held 2 cards and only 5 replacement cards were dealt, a total of 10 unique 5-card final hands were formed and compared to the paytable. This was accomplished by taking the 5 replacement cards in combinations of 3 at a time (5 card pool, choosing 3 of the cards from the pool at a time=10 possible permutations/combinations of 3 replacement cards which may be combined with the held cards to form final hands).

The number of cards in the set of replacement cards is preferably at least equal to the number of cards in the originally dealt hand, so that multiple subsets of the replacement cards may be utilized to complete and evaluate final poker hands. In the preferred embodiment, as in the example cited above, the number of replacement cards is equal to the number of cards originally dealt.

As used herein, the replacement set of cards may be referred to as an enhanced set of replacement cards. In existing poker games, it is known to provide a single replacement card for each card which a player discards from their initial dealt hand (such that the number of replacement cards is entirely dependent upon the number of cards which the player discards). As detailed herein, instead of providing a replacement card for each discarded card, a set of replacement cards is provided which is not based upon the number of cards discarded by the player. Most preferably, in accordance with the present invention, the number of replacement cards in the set of replacement cards is greater than the number of discarded cards. Thus, the replacement set of cards of the invention may be referred to as an enhanced replacement set because the replacement cards are not dependent on the number of discarded cards, but the set is enhanced to not be dependent upon the number of discarded cards.

In some embodiments, the enhanced set of replacement cards may only be available when certain criteria or conditions are met or occur. For example, in one embodiment, the enhanced set of replacement cards may only be dealt when the player has received one or more designated combinations of dealt cards or when the player has held one or more designated combinations of cards. The one or more designated combinations of cards may be displayed to the player, or a special indicator may be used in the pay table to indicate which potential combinations of cards qualify for a set of replacement cards (so that a player can attempt to hold cards from the set of dealt cards in order to generate a set of held cards which qualifies for an enhanced set of replacement cards rather than receiving a single replacement card for each discarded card). For example, 5 replacement cards may be given to the player if the player has held 3 or 4 cards that may be part of a Royal Flush, such as the cards 10♠, Q♠, and K♠ from the dealt cards 10♠, Q♠, K♠, 4♠ and 9♦. The gaming machine determines that the three cards which the player held from the initial five dealt cards form a portion of a potential Royal Flush, such that the held cards comprise a predetermined or designated set of cards for which an enhanced set of replacement cards should be provided. If criteria are not met (such as if the cards held by the player do not comprise one of the designated combinations of cards), then each card which is discarded by the player may be replaced by a single replacement card as in standard poker games (rather than with a set of replacement cards in accordance with the present invention). This configuration of the invention may be used to give the player multiple opportunities to complete a designated winning hand, such as when they are close to completing that hand. In the example given above, in the prior art the player would be dealt two replacement cards for the two discarded cards, such that the player only receives one opportunity to receive a Royal Flush. In accordance with the present invention, the player may be dealt a set of five replacement cards so that the player has 10 opportunities (10 different hands formed by using combinations of two of the five replacement cards with the three held cards to form all permutations of five final cards) to receive a Royal Flush (of course, the set of replacement cards might comprise other numbers of cards, such as three, four, six or the like, but in all such cases, more than one additional hand is formed as a result of the number of replacement cards exceeding the number of discarded cards).

Of course, various criteria might be used to trigger entitlement to an enhanced set of replacement cards in accordance with the present invention. For example, various combinations of dealt or held cards might trigger entitlement to an enhanced set of replacement cards (other than three or four cards to a Royal Flush), such as, but not limited to: two, three or four cards to a Straight or Flush, Three of a Kind, Two Pair, or specific cards in such combinations, such as three cards to a Royal Flush where one of the three cards comprises an Ace, or Three of Kind where the rank of the cards comprising the Three of a Kind comprises Jacks or higher. As another example, a Three of a Kind might comprise a designated combination of cards, such that if the player's held cards comprised 8♠, 8♣, 8♥ and A♥, the player would be entitled to an enhanced set of replacement cards, such as five replacement cards for the single discarded cards.

The manner by which the game information is presented to the player may vary. In a preferred embodiment, the 5 original cards are dealt or displayed across the bottom of a video screen, as is conventional in video poker. Once the player has selected which cards to hold (such as by pressing a "Hold" button associated with each card to be held) and pushed the Draw button, then the discards (i.e. cards which are not held) are removed. The set of five new replacement cards are "dealt" (i.e. displayed) above the original 5 cards, and then turned face-up.

In a preferred embodiment, the subsets of the replacement cards which comprise winning hands (referred to as winning ways) may be cycled through and shown briefly placed into the original hand as replacement cards, while displaying the winning hand type and payoff. In another embodiment, none of the replacement cards are depicted in the original hand, but winning ways or combinations are sequentially highlighted (for example, by "sheening" each winning 5 card combination consisting of the subset of replacement cards and the held cards, while showing the winning had type and payoff, or by boxing the winning 5 card combinations, etc). In another embodiment, winning ways or combinations are depicted elsewhere on the screen by reproducing the ways in miniature, and showing adjacent to each way the hand type and payoff, as applicable. Other representations of winning combinations are possible, such as moving the replacement cards into the original hand for winning ways, by using multiple colored boxes, by the use of shading, underlining or other markings. In the case of multicolored boxes or underlinings, each color may represent a particular type of hand, e.g., a 3 of a Kind combination may be colored green, a 2 Pair combination may be colored blue, etc. for ease of discernment by the player as to which cards combined to make the various winning ways. Alternatively, each box color may represent a winning hand outcome, for example the first winning way is boxed red, the second orange, the third yellow, etc.

As another example of a method of the invention, assume the player wagers 10 credits or units and is dealt the following set of cards: K♥, J♥, 10♥, 7♥, 10♦.

Here, the player may decide to keep the four Hearts and try for a Flush hand. Thus the player has held 4 cards and needs to draw 1 replacement card to make a hand. Again, according to the game play method of the present invention, a second set of 5 replacement cards are simultaneously displayed. Each subset of 1 (of the 5) replacement cards, in turn, is then evaluated with the held cards to form a hand, in order to determine the wagering outcome. By way of example, consider the following set of 5 replacement cards: 10♠, K♠, 9♥, 5♦, 3♥.

The player (who wagered 10 units and, on the original deal, held four cards to a Flush) would thus complete the hand the following 5 ways:

K♥, J♥, 10♥, 7♥, 10♠
K♥, J♥, 10♥, 7♥, K♠ (Pair of Kings)
K♥, J♥, 10♥, 7♥, 9♥ (Flush)
K♥, J♥, 10♥, 7♥, 5♦
K♥, J♥, 10♥, 7♥, 3♥ (Flush)

Because only 5 final hands are formed, in a preferred embodiment all payoffs or awards are automatically doubled (multiplied by 2). In particular, because the player effectively wagered 2 credits or units per hand (10 credits or units wagered against 5 final hands, 10/5=2), the player is paid at twice the normal rate for awards based upon 1 credit or unit wagered per hand. As such, in this example, the player would be paid 10 units (5×2) for each Flush, and 2 units (1×2) for the Pair of Kings, for a total of 22 units, corresponding to a net win of 12 units.

In a preferred embodiment where the initial set of cards comprises 5 cards, the set of replacement cards comprises the same number of card, i.e. 5 cards. The number of hands formed, or completed, is thus a function of the number of cards drawn. In the examples cited above, a player drawing 3 cards has 5 choose 3=10 ways to complete the hand. A player drawing only 1 card has 5 choose 1=5 ways to complete the hand. In general, when drawing a subset of Y cards from a set of Z, we find that Z choose Y (ZcY in shorthand notation)=Z!/{Y!(Z−Y)!}. Hence, for the case wherein Z=5 and Y=3, we find 5!/{3! 2!}=10 ways. Similarly, we find the following:

TABLE 2

| |
|---|
| 5c0 = 1 way, bonus multiplier = 10/1 = 10× if holding 5 cards and drawing 0 |
| 5c1 = 5 ways, bonus multiplier = 10/5 = 2× if holding 4 cards and drawing 1 |
| 5c2 = 10 ways, bonus multiplier = 10/10 = 1× if holding 3 cards and drawing 2 |
| 5c3 = 10 ways, bonus multiplier = 10/10 = 1× if holding 2 cards and drawing 3 |
| 5c4 = 5 ways, bonus multiplier = 10/5 = 2× if holding 1 card and drawing 4 |
| 5c5 = 1 way, bonus multiplier = 10/1 = 10× if holding 0 cards and drawing 5 |

As such, in the preferred embodiment the associated bonus multipliers are a function of how many cards the player holds, which in turn determines how many cards the player discards/draws (because the number of cards held from the first set, plus the number of cards drawn from the second set to form each final hand equals a constant, e.g. 5 in the preferred embodiment).

In one embodiment the base paytable remains constant and the player is shown a bonus multiplier appropriate to the number of cards held (or equivalently, drawn). In another embodiment, the bonus multiplier is automatically multiplied into the base paytable once the player commits to the cards held, creating an enhanced paytable for the final hand resolution.

It is noted that a player holding all 5 cards is given a bonus multiplier of 10× the base paytable, in accord with the wager of 10 credits applying to one final hand (i.e no cards are used from a second set of cards as the original five cards from the first set of cards form the final hand). Similarly, a player holding no cards (hence drawing 5 cards) will be given a bonus multiplier of 10× the resultant hand outcome, again in accord with the wager of 10 credits applying to one final hand. In each case, this is because there is only one way to form the final hand that is then compared to the paytable.

In one embodiment, the player may wager a multiple of 10 credits to initiate play at a multiple of the base paytable. For example, a player wagering 30 credits would receive an enhanced base paytable equal to 3 times that depicted in FIG. 1. The bonus multiplier would then be multiplied by this enhanced base paytable. For example, a player wagering 30 credits who is dealt a Flush and holds all 5 cards would be paid 5×3×10=150 credits. The multiple of credits to initiate play may be coupled with an enhanced pay for a specific type of hand, for example a Royal Flush. For example, the base pay for a Royal Flush may be 250 for 10 credits wagered, 500 for 20 credits wagered, and so forth, but jump to 4,000 for 50 credits wagered.

In another embodiment, the player may wager more to receive additional sets of replacement cards. In particular, the player may wager a multiple of 10 credits to receive the corresponding number of sets of replacement cards. For example, instead of a wager of 10 credits, wherein one set of 5 replacement cards is utilized as described above, the player may wager 20 credits and receive 2 sets of 5 replacement cards. Or, the player may wager 50 credits and receive 5 separate sets of 5 replacement cards each, etc. In this embodiment, each replacement set is separately utilized to form final hands as described above.

It is a distinct advantage of this game that the optimal player strategy is identical to that of standard video poker. It is also a distinct advantage that the instant invention accommodates all existing variations of draw poker (e.g., Deuces Wild, Jacks or better, Double Double Bonus, etc.) as well as all existing paytables. It is another distinct advantage of this invention that the player is able to wager on the potential of one or multiple hand outcomes, each with a potential bonus multiplier associated therewith. An additional advantage of the invention is a method of play wherein an original video poker paytable, after wagering has taken place and during the play of the hand, may be modified to yield a bonus multiplier and/or enhanced payoffs, due to the number of cards held (or alternately, discarded) by the player.

In another embodiment of the invention, a player may make an additional wager to play for enhanced bonus multipliers. For example, a player wagering a total of 20 units (i.e., an extra 10 units) may given the following bonus multipliers:

10×, 20× or 30× if holding 5 cards and drawing 0
2×, 4×, 6× if holding 4 cards and drawing 1
1×, 2× or 3× if holding 3 cards and drawing 2
1×, 2× or 3× if holding 2 cards and drawing 3
2×, 4× or 6× if holding 1 card and drawing 4
10×, 20× or 30× if holding 0 cards and drawing 5

In practice, one of the appropriate multipliers may be drawn at random based on the number of cards the player held. As is readily apparent, the player's wager of an extra 10 credits/units has served to, on average, double the associated bonus multiplier based on the number of held cards. If order to avoid randomness, the bonus multipliers could instead simply be multiplied by 2×. Utilizing randomness, a player wagering a total of 15 units may receive possible multipliers of 10×, 15×, 20× if holding 5 cards, e.g. The optimal play strategy, even if a player makes an additional wager to play for enhanced bonus multipliers, and whether randomness or not is utilized to determine the bonus multipliers, remains identical to the original game. Also, a wager for an enhanced bonus multiplier may be combined with a wager to multiply the base paytable.

In another embodiment, the player may receive a bonus for being dealt specific hands either on the original 5 card deal, or on the 5 replacement cards. For example, a player who is dealt a Royal Flush as the set of 5 replacement cards (e.g., the 5 replacement cards are 10♥, Q♥, A♥, K♥, J♥) may receive a bonus of 100× the player's wager. Instead of or in addition to a bonus, specific hands may win a progressive award.

In another embodiment, the number of cards in the replacement set is greater than, or less than, the number of cards in the first set (5 cards in the preferred embodiment). For example, 6 replacement cards may be utilized, and the associated bonus multipliers would be suitably adjusted, e.g., a player initiates play with a 30 unit wager and would receive the following bonus multipliers:

TABLE 3

| |
|---|
| 6c0 = 1 way, bonus multiplier = 30/1 = 30× if holding 5 cards and drawing 0 |
| 6c1 = 6 ways, bonus multiplier = 30/6 = 5× if holding 4 cards and drawing 1 |
| 6c2 = 15 ways, bonus multiplier = 30/15 = 2× if holding 3 cards and drawing 2 |
| 6c3 = 20 ways, bonus multiplier = 30/20 = 1× or 2× if holding 2 cards and drawing 3 |
| 6c4 = 15 ways, bonus multiplier = 30/15 = 2× if holding 1 card and drawing 4 |
| 6c5 = 6 way, bonus multiplier = 30/6 = 5× if holding 0 cards and drawing 5 |

Note that in this case, if the player holds 2 cards, the desired average multiplier of 1.5 (equal to 30/20) is accomplished by randomly choosing between the two integer values 1× and 2×.

Of course, other possibilities also exist. Referring now back to the original example of Jacks or better draw poker wherein only one set of 5 replacement cards is utilized, in one embodiment, a player wagering more than 10 units may receive bonus multipliers which are randomly determined in real time. For example, the original bonus multiplier set of {10×, 2×, 1×, 1×, 2×, 10×} may be provided for a wager of 10 units. By way of example, a player wagering 27 units is "due"

an average bonus multiplier set of {27×, 5.4×, 2.7×, 2.7×, 5.4×, 27×} or 27/10 times the original bonus multiplier set. Therefore, to make the bonus multipliers integer values, the following adjustments may be utilized. If the player holds 0 or 5 cards, the player receives a bonus multiplier of 27× with 100% probability (or, for example, 20× with 10%, 25× with 40%, and 30× with 50% probabilities still yielding an average multiplier of 27×). If the player holds 1 or 4 cards, the player receives a bonus multiplier of 5× with 60% probability and a multiplier of 6× with 40% probability. If the player holds 2 or 3 cards, the player receives a bonus multiplier of 2× with 30% probability and a multiplier of 3× with 70% probability. Of course, other ways exist to create non-integer average multipliers using only integer multipliers and randomness. The precise manner of doing so is a matter of design choice. It may be calculated in real time based on the wager.

While the preceding has been discussed in terms of 5-card draw poker, it is also applicable to other draw poker variations, including Deuces Wild, etc. It is also applicable to 3-card draw, or draw poker with other numbers of cards. For example, instead of forming a 5 card hand, a player might attempt to form a final hand of less than 5 cards (such as 3 cards), or more than 5 cards (such as 6 cards).

The game may also be implemented in a form wherein the player is dealt four cards face-up, decides which cards to hold/discard, and then is dealt replacement cards prior to revealing a fifth and final card to complete the hand (see U.S. Pat. No. 6,478,675, which is incorporated in its entirety herein by reference). In this case, the set of 5 replacement cards utilized in this invention can be utilized for either the 4-card face-up portion of the hand, or for the entire 5-card hand. By way of example, we assume the player has wagered 10 units in a Deuces Wild game and is dealt the following: J♣, K♣, 4♦, 2♥, XX.

Note that four cards are face-up and one is face-down (represented as XX). The player chooses to keep only the deuce. A set of five replacement cards is revealed, as follows: 2♣, 9♣, 7♦, 5♥, 10♦.

Note that in this version, a player holding 1 card is drawing subsets of 3 cards from the replacement cards (because the XX card is not drawn and is considered already dealt). Before, during or after the set of replacement cards is revealed, the face-down XX card is revealed (turned or showed face-up)—by way of example, assume it is 9♥. Thus, the final hands formed are as follows:

2♣, 9♣, 7♦, 2♥, 9♥
2♣, 9♣, 5♥, 2♥, 9♥
2♣, 9♣, 10♦, 2♥, 9♥
2♣, 7♦, 5♥, 2♥, 9♥
2♣, 7♦, 10♦, 2♥, 9♥
2♣, 5♥, 10♦, 2♥, 9♥
9♣, 7♦, 5♥, 2♥, 9♥
9♣, 7♦, 10♦, 2♥, 9♥
9♣, 5♥, 10♦, 2♥, 9♥
7♦, 5♥, 10♦, 2♥, 9♥

Assuming a 3 of a Kind is needed to win, hands number 1, 2, 3, 4, 5, 6, 7, 8 and 9 would all be paid.

In another embodiment of this type of game, the set of replacement cards is used for the fifth face-down card as well. Preferably in this embodiment, the fifth card is not dealt, and rather only the four cards from which the player may hold and discard/draw. Then the five replacement cards are revealed and subsets are used to make the five card hands. Note that in this version, a player holding 1 card would be drawing 4 cards, etc.

As well, the instant invention can be utilized as a stud variation. The stud variation may apply either after a 5-card stud poker hand or after a 5-card draw poker hand takes place. By way of example, consider a 5-card draw poker game in which, after the player draws the replacement cards in a traditional manner, 2 additional cards are utilized to make a 7-card stud hand (see U.S. Pat. No. 6,206,780 which is incorporated herein in its entirety by reference). Under the teachings of the instant invention as described earlier, a set of 5 replacement cards may be utilized during the portion of the game having to do with 5-card draw poker. However, under the teachings herein, a separate set of replacement cards (e.g., 5 or 10) may also be utilized during the portion of the game having to do with 7-card stud poker (whether or not the instant invention is utilized during the draw portion of the game). As but one example for the 7-card wager, instead of 2 cards being revealed to determine the resolution of the wager (as taught in '780), a separate set of 10 cards could be used. Then, taking the 10 cards in subsets of 2 at a time, a total of 45 7-card hands could be resolved. Instead, a separate set of 5 cards could be used (instead of 10) in subsets of 2 at a time, making a total of 10 7-card hands, etc.

As described, one aspect of the invention is a novel method whereby a video poker player is able to wager on potential multiple hand outcomes, each with a potential bonus multiplier associated therewith based upon the number of cards held by the player, and yet the optimal player strategy is identical to that of standard video poker, so that there is therefore no learning curve. As aforementioned, it is also an advantage that the instant invention accommodates all existing variations and paytables of draw or stud poker.

As indicated herein, the method of game presentation and play are preferably implemented at an electronic gaming machine. As indicated, game information is preferably displayed to the player via a video display. In that configuration, the step of "dealing" one or more cards preferably comprises the selection of one or more cards and then displaying card images or other graphical representations of cards upon the video display to the player. Of course, such information may be displayed in various manners.

While in one or more preferred embodiment, the game is played by a player placing wagers of 10 unit or credit increments, wagers of other values might be utilized. For example, a player might be permitted to place wagers of 100 unit or credit increments (100 credits, 200 credits, etc.), or other entirely different values (22 credits, 8 credits, etc.). Of course, in such embodiments, as detailed above, the value of awards for winnings hands may be adjusted or varied to address the wager amount against the hands and paytable award scheme.

While the examples illustrating the game and its play and different options for methods of execution are explained throughout the preceding disclosure, skilled artisans will appreciate that many variations of the design will be possible. The invention as described therefore is not limited to the specific examples cited, as those skilled in the art will be able to apply the instant invention in other embodiments as a matter of design choice. The specific examples of equipment and play should not be considered limiting. Rather, the invention is to be afforded the breadth and scope as found in the attached claims.

What is claimed is:

1. A method of playing video poker in which a player wagers on an electronic gaming device, the electronic gaming device comprising a processor and a display, and being configured to accept wagers and award payouts, the method comprising the steps of:

initiating play when a wager is received from the player;
displaying a first set of a given number of cards;
allowing the player, via input, to hold cards of the first set;

if the held cards comprise a designated combination of cards, displaying a second set of cards, a number of which is not based on a number of cards held by the player; and forming, by combining the held cards from the first set of cards and each possible subset of cards from the second set of cards, final hands of cards having a number of cards equal to the given number, each card in the second set of cards being used at least once in combination with the held cards from the first set of cards to form at least one of the final hands.

2. The method according to claim 1, wherein the second set of cards is displayed if a number of held cards meet a predetermined threshold of held cards.

3. The method according to claim 1, wherein the given number of the first set of cards is 5.

4. The method according to claim 1, wherein the number of the second set of cards is 5.

5. The method according to claim 1, wherein an initial paytable is available to the player prior to the step of displaying the first set of cards and is modified by a multiplier prior to the step of displaying the second set of cards.

6. The method according to claim 5, wherein the initial paytable is based upon the number of cards held.

7. The method according to claim 6, wherein the multiplier is 1× if 2 or 3 cards are held, 2× if 1 or 4 cards are held and 10× if 0 or 5 cards are held.

8. The method according to claim 1, wherein if the held cards do not comprise a designated combination of cards, displaying a single replacement card for each discard card and forming a single final hand.

9. The method according to claim 8, wherein the designated combination of cards comprises at least two cards that would form a part of at least one predetermined winning hand.

10. The method according to claim 9, wherein the designated combination of cards is at least one member of the group comprising: 2, 3, or 4 cards of a royal flush; 2, 3, or 4 cards of a straight flush; 2, 3, or 4 cards of a flush; 2, 3, or 4 cards of a straight; and 2 cards of three of a kind.

11. A method of playing video poker in which a player wagers on an electronic gaming device, the electronic gaming device comprising at least a processor, a display, an input device, and an output device, and being configured to accept wagers and award payouts, the method comprising the steps of:

displaying a first set of cards;

allowing the player, for the first set, to hold a set of held cards and discard a number of discard cards;

if the set of held cards comprises a designated combination of cards, displaying a second set of cards, a number of cards in the second set of cards (i) being fixed, (ii) being at least equal to a number of cards in the first set of cards, and (iii) being independent of a number of cards in the set of held cards;

combining the set of held cards with subsets of at least one card from the second set, each subset of at least one card being equal in number to the number of discard cards, to form final hands of cards each having a number of cards equal to the number of cards in the first set of cards, and each of the cards from the second set being used at least once in combination with the set of held cards in forming at least one of the final hands; and awarding payouts for each final hand which is a winning hand in accordance with a paytable.

12. The method according to claim 11, wherein the first set of cards comprises 5 cards.

13. The method according to claim 12, wherein the second set of cards comprises 5 cards.

14. The method according to claim 11, further comprising the step of displaying each final hand.

15. The method according to claim 11, further comprising the step of displaying each final hand which comprises a winning hand.

16. The method according to claim 11, wherein the first set of cards comprises 5 cards and the second set of cards comprises 5 cards and the step of combining comprises generating:

1 final hand if the number of discard cards is 0 or 5;

5 final hands if the number of discard the number of discard cards is 1 or 4; and 10 final hands if the number of discard the number of discard cards is 2 or 3.

17. The method according to claim 11, wherein if the set of held cards does not comprise a designated combination of cards, displaying a single replacement card for each discard card and forming a single final hand.

18. A method of playing video poker in which a player wagers on an electronic gaming device, the electronic gaming device comprising at least a processor, a display, an input device, and an output device, and being configured to accept wagers and award payouts, the method comprising the steps of:

displaying a first set of cards;

allowing the player, for the first set, to hold a set of held cards and discard a number of discard cards;

if the set of held cards comprises a designated combination of cards, displaying a second set of cards, a number of cards in the second set of cards being greater than the number of discard cards;

combining the set of held cards with subsets of at least one card from said second set, a number of cards in each subset of at least one card being equal to the number of discard cards, to form final hands of cards having numbers of cards equal to a number of cards of the first set of cards, and each of the cards of the second set is used in combination with the set of held cards from said first set in forming at least one of said final hands; and awarding payouts for each final hand which is a winning hand in accordance with a paytable.

19. The method according to claim 18, further comprising the step of displaying each final hand.

20. The method according to claim 18, further comprising the step of displaying each final hand which comprises a winning hand.

21. The method according to claim 18, wherein the first set of cards comprises 5 cards.

22. The method according to claim 18, wherein if the set of held cards does not comprise a designated combination of cards, displaying a single replacement card for each discard card and forming a single final hand.

* * * * *